(12) United States Patent
Huang et al.

(10) Patent No.: US 10,637,739 B2
(45) Date of Patent: Apr. 28, 2020

(54) NETWORK TOPOLOGY SYSTEM AND BUILDING METHOD FOR TOPOLOGIES AND ROUTING TABLES THEREOF

(71) Applicant: NATIONAL CHENG KUNG UNIVERSITY, Tainan (TW)

(72) Inventors: Chi-Chuan Huang, Tainan (TW); Chi-Hsiu Liang, Taichung (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 387 days.

(21) Appl. No.: 15/806,317

(22) Filed: Nov. 7, 2017

(65) Prior Publication Data

US 2019/0052535 A1 Feb. 14, 2019

(30) Foreign Application Priority Data

Aug. 11, 2017 (TW) .............................. 106127239 A

(51) Int. Cl.
*H04L 12/24* (2006.01)
*H04L 12/42* (2006.01)
*H04L 12/751* (2013.01)
*H04L 12/721* (2013.01)

(52) U.S. Cl.
CPC .............. *H04L 41/12* (2013.01); *H04L 12/42* (2013.01); *H04L 45/02* (2013.01); *H04L 45/12* (2013.01)

(58) Field of Classification Search
None
See application file for complete search history.

(56) References Cited

U.S. PATENT DOCUMENTS

2012/0120949 A1\* 5/2012 Raghuraman ........... H04L 45/04
370/389
2017/0085463 A1\* 3/2017 Lih ....................... H04L 12/437

FOREIGN PATENT DOCUMENTS

EP           0514043 A2 \* 11/1992   ....... G06F 15/17343

\* cited by examiner

*Primary Examiner* — Cai Y Chen
(74) *Attorney, Agent, or Firm* — Maschoff Brennan

(57) ABSTRACT

A network topology system having a plurality of nodes for data exchange is provided, with the number of said nodes being N. The nodes are sequentially connected to form a ring communication configuration. N is an even integer. The i-th node of said nodes connects to the [(i+m) mod N]-th and [(i+p) mod N]-th nodes according to a connection rule. The j-th node of said nodes connects to the [(j−m) mod N]-th and [(j+p) mod N]-th nodes according to the connection rule. i and j are non-negative integers and are less than N. m and p are integers and not larger than N. Here, i and m are odd numbers, and j and p are even numbers.

11 Claims, 3 Drawing Sheets

NETWORK TOPOLOGY SYSTEM AND BUILDING METHOD FOR TOPOLOGIES AND ROUTING TABLES THEREOF

CROSS-REFERENCE TO RELATED APPLICATIONS

This non-provisional application claims priority under 35 U.S.C. § 119(a) on Patent Application No(s). 106127239 filed in Taiwan, R.O.C. on Aug. 11, 2017, the entire contents of which are hereby incorporated by reference.

TECHNICAL FIELD

The disclosure relates to a network topology system and building method for topologies and routing tables thereof, more particularly to a network topology system producing homogeneous network structures, and building method for topologies and routing tables thereof.

BACKGROUND

A network, sometimes referred to as a graph or circuit, is constituted by a number of nodes and a number of lines each connecting one node to another node. In network terminology, a node is usually referred to as a vertex, the line connecting this node to another node is referred to as a route or edge, the number of routes connecting to a node is referred to as the degree of this node, and the distribution of these degrees is referred to as a degree distribution.

The term network topology defines the organization of the points and the connections between points to form a network, whereas it can sometimes be referred to as the resulting network itself or a subset of the resulting network. For instance, the term 'ring network' can be mutually understandable as 'ring topology'. In a computer network, each node may be a network switch in a network on chip, a core of a processor, a processor on a motherboard, a computer, a network switch in a cluster computer, a server in any infrastructure, or an information center.

In the case of a supercomputer, the efficiency of transmission of message packets between points is affected by the network infrastructure. In practice, the delay of transmission of message packets is usually caused by the time of a network switch buffering a message packet, by the time of delay while trying to acquire a channel, or by the time of redirection. In a network topology system, if on average, a message packet needs to visit many network switches, the transmission or waiting time required by this message packet will become very long, leading to a heavy burden on each node.

As described above, if a network topology is not subjected to an optimization process, a message packet may be transmitted through an inferior route, so that in addition to the increase of the load on each network switch, the transmission time also becomes longer.

SUMMARY

According to one or more embodiments, the present disclosure provides a network topology system including N nodes for data exchange. The N nodes are sequentially connected to form a ring communication configuration, where N is a positive even integer. The i-th node of the N nodes is further connected to the [(i+m) mod N]th and [(i+p) mod N]th nodes of the N nodes according to a connection rule. The j-th node of the N nodes is further connected to the [(j−m) mod N]th and [(j+p) mod N]th nodes of the N nodes according to the connection rule. Here, i and j are less than N, m and p are not larger than N, i and m are positive odd numbers, j is a non-negative even number, and p is a positive even number.

According to one or more embodiments, the present disclosure provides a topology building method for a network topology system, and the topology building method is applied to N nodes for data exchange. The N nodes are sequentially connected to form a ring communication configuration. In the topology building method, first nodes among the N nodes are defined to be a group of initial nodes. The first nodes subsequently correspond to the second nodes in the N nodes. Then, the way each of the first nodes among the N nodes is connected to which of the second nodes among the N nodes is decided by a connection rule. In the connection rule, when the i-th node of the N nodes is connected to the [(i+m) mod N]th and [(i+p) mod N]th nodes of the N nodes, the j-th node of the N nodes is further connected to the [(j−m) mod N]th and [(j+p) mod N]th nodes of the N nodes. Here, i and j are less than N, m and p are not larger than N, i and m are positive odd numbers, j is a non-negative even number, and p is a positive even number.

The present disclosure provides a routing table building method of a network topology system. The network topology system includes N nodes for data exchange. The N nodes are sequentially connected to form a ring communication configuration, whereas N is a positive even integer. The i-th node of the N nodes is further connected to the [(i+m) mod N]th and [(i+p) mod N]th nodes of the N nodes according to a connection rule, and the j-th node of the N nodes is further connected to the [(j−m) mod N]th and [(j+p) mod N]th nodes of the N nodes according to the connection rule, wherein i and j are less than N, m and p are not larger than N, i and m are positive odd numbers, j is a non-negative even number, and p is a positive even number. The routing table building method includes: obtaining at least one shortest route from the x-th node of the N nodes to the y-th node of the N nodes, wherein x and y are non-negative integers, x and y are less than N, and x is not equal to y; obtaining at least one second shortest route from the x-th node to the y-th node; generating a first routing table related to a u-th node of the N nodes according to the shortest routes and the second shortest routes, wherein u is a positive odd number, and u is less than N; and generating a second routing table related to a v-th node of the N nodes according to the shortest routes and the second shortest routes, wherein v is a non-negative even number and is less than N, and the first routing table is essentially equivalent to the second routing table.

BRIEF DESCRIPTION OF THE DRAWINGS

The present disclosure will become more comprehensive from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

Figure 1:
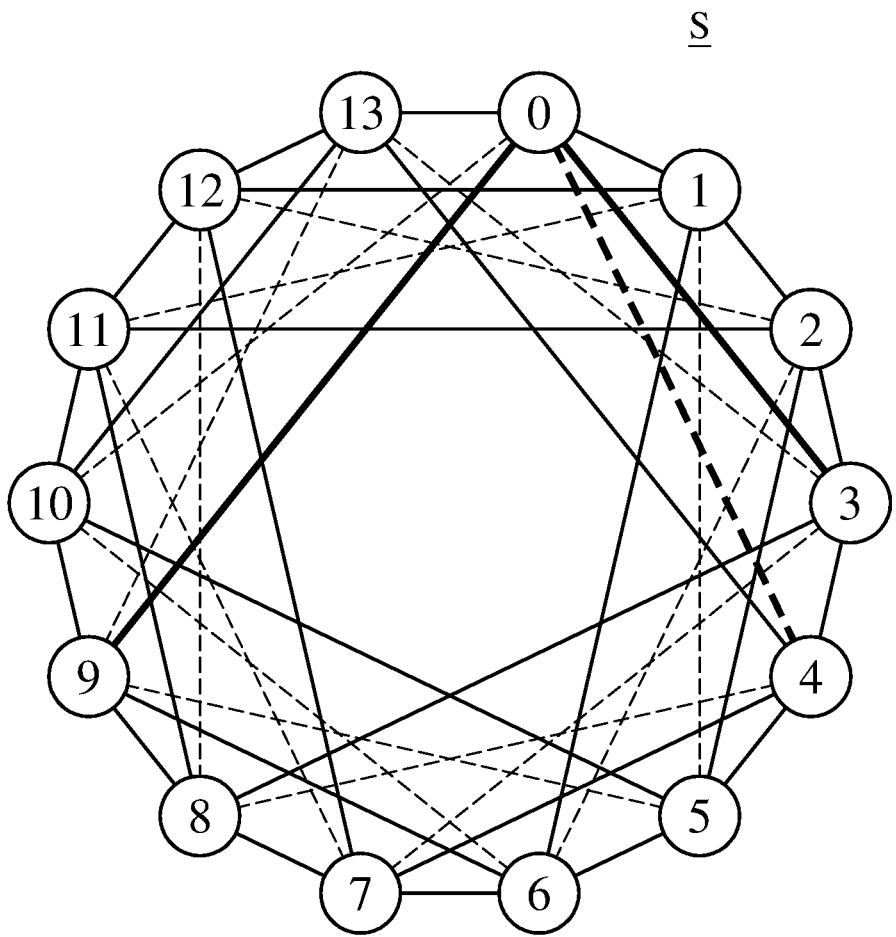
FIG. 1 is a schematic diagram showing a topology of a network topology system according to an embodiment of the disclosure.

Please refer to FIG. 1, which is a schematic diagram showing a topology of the network topology system according to an embodiment of the disclosure. As shown in FIG. 1, a network S includes N nodes of data exchange, whereas N is a positive even integer. For convenience, the node of data exchange is referred to as node hereafter. The N nodes are sequentially connected to form a ring communication configuration. From another point of view, the N nodes at least constitute a ring topology. In an embodiment, the communication connection described above or below is carried out by, one or more physical circuits. This embodiment is exemplarily explained based on the case using the nodes 0~13, that is, N is 14 in this embodiment. However, the number of nodes in the network S is not limited to this example. Here, each of the nodes is implemented by, for example, a single core on chip, a processor, the core of a processor, a computer, a group of internally optimized computers, a network switch, a network switch in a cluster computer structure, or a computer center.

Each of the nodes 0~13 can be linked to one or more computing units. In an embodiment, the nodes 0~13 are network switches as described above, and each of the nodes 0~13 can be further linked to one or more computers. In another embodiment, the nodes 0~13 are respectively network switches of motherboards, and the nodes 0~13 can each be linked to one or more central processing units (CPUs).

Each of the Nodes 0~13 is connected to at least another one of the Nodes 0~13 according to a connection rule. In detail, the connection rule is that: the i-th node is connected to the [(i+m) mod N]th node and the [(i+p) mod N]th node, the j-th node is connected to the [(j−m) mod N]th node and the [(j+p) mod N]th node, where i and j are less than N, m and p are not larger than N, i and m are positive odd numbers, j is a non-negative even number, and p is a positive even number. Particularly in this embodiment, N is 14, i is 1, 3, 5, 7, 9, 11 or 13, j is 0, 2, 4, 6, 8, 10 or 12, and m and p are integers of 0~13. Note that a person of ordinary skill in the art can appreciate in view of the detailed description herein that the ID is used for indicating a relative position of a respective node in a logic structure or a topology structure but not for limiting the real position of the node. Moreover, the term "mod" expresses congruence operation (sometimes called modulo operation). In the case of [(j−m) mod N], [(j−m) mod N] expresses the remainder of (j−m) divided by N. The remainders described in this and following embodiments are positive remainders.

Therefore, in accordance with the connection rule, odd nodes among the Nodes 0~13 will connect to at least one even node, and even nodes among the Nodes 0~13 will connect to at least one odd node. For convenience, "a node connected to/linked to another node" is defined as "a node hops to another node" in a wireless or wired communication matter hereafter. Based on the difference between the IDs of two nodes, the hop can be defined as an odd hop or even hop. Specifically, when the difference in ID between two nodes is an odd number, the hop will be defined as an odd hop. For example, connecting Node 0 to Node 5 is defined as an odd hop. Rather, when the difference in ID between two nodes is an even number, the hop is defined as an even hop. For example, connecting Node 3 to Node 7 is defined as an even hop.

Continuing the above description, since m is an odd number, linking the i-th node described above to the [(i+m) mod N]th node is an odd hop and linking the j-th node described above to the [(j−m) mod N]th node is an odd hop. And, since p is an even number, linking the i-th node described above to the [(i+p) mod N]th node is an even hop and linking the j-th node described above to the [(j+p) mod N]th node is an even hop. In FIG. 1, the two thick solid lines denote two odd hops starting from Node 0 and the thick broken line denotes an even hop starting from Node 0, thereby contrasting them.

In another aspect, when it is set that an odd hop is performed from the even node in a clockwise direction in the drawing, the same odd hop is performed from the odd node in a counterclockwise direction in the drawing. Therefore, when the i-th node is connected to the [(i+m) mod N]th node, the j-th node is connected to the [(j−m) mod N]th node. Oppositely, when it is set that an even hop is performed from an even node in a clockwise direction in the drawing, the same number of even hops is performed from the odd node in the clockwise direction on the drawing. Therefore, as described above, when the i-th node is connected to the [(i+p) mod N]th node, the j-th node is connected to the [(j+p) mod N]th node. Through such a connection method, the number of connections of each of the nodes is predicted, so creating an unexpected connection may not occur during networking. Accordingly, it is convenient for the designer to estimate the configuration of the resulting topologies.

Note that this embodiment is based on the case where an odd hop is performed from the even node in the clockwise direction and an odd hop is performed from the odd node in the counterclockwise direction; however, in practice, it may be set that an odd hop is performed from the even node in the counterclockwise direction and an odd hop is performed from the odd node in the clockwise direction, and the present disclosure is not limited thereto. No matter if one or more even hops are performed from any of the nodes in the clockwise direction or in the counterclockwise direction, the resulted topology structures are the same. Here, the present disclosure does not intend to limit the direction of an even hop.

Moreover, because all the nodes together form a ring communication configuration, when the sum of the IDs and the positive number of hops is larger than the maximum of all the IDs, this situation is equivalent to restarting a count from the node having the minimum ID to the node having the maximum ID. In contrast, when the sum of the IDs and the negative number of hops is less than the minimum one of all the IDs, this situation is equivalent to restarting a countdown from the node having the maximum ID to the node having the minimum ID. The mod operation described above is used to express such cycle counting.

Continuing the above description, in the case of the network S shown in FIG. 1, Node 0 is an even node and is connected to Node 3 and Node 9; therefore, Node 1 is an odd node connecting to Node 12 and Node 6 in correspond to Node 0. From another point of view, the hop from Node 0 to Node 3 is defined to be +3, the hop from Node 0 to Node 9 is defined to be +9, the hop from Node 1 to Node 12 is defined to be −3, and the hop from Node 1 to Node 6 is defined to be −9. Here, the positive and negative signs of the hop denote the directions of a hop. The rest of the nodes can be deduced by analogy and thus, their detailed descriptions are omitted.

In the embodiment corresponding to FIG. 1, two odd hops and one even hop are performed from a respective node. However, this embodiment is merely an example, so it is possible in fact to perform one or more odd hops from a respective node and one or more even hops from a respective node. The present disclosure is not limited to the above example.

Following the above description, the strategy of applying opposite connection directions on even and odd nodes efficiently reducing the number of connections between the nodes, providing if the same network diameter and average distance to be the constraint. The network S therefore also has a homogeneous topological structure, where each node in the network S has the same number of outward connections with the same hops (irrespective of direction here).

On the other hand, through the connections of the odd hops, a message packet can visit one or more of the odd nodes when being delivered from an even node, and a message packet can visit one or more of the even nodes when being delivered from an odd node. In other words, a node in the network topology system provided in the present disclosure can communicate with any node through proper means of routing so that a message packet can arrive at a desired node through a proper route. The means of routing will be described later.

Through the communication formed by the even hops, an even node and another even node have a direct route therebetween, so a message packet may be transmitted from this even node to another even node without passing through another odd node, and forwarding the message packet can be omitted at least once. Similarly, through the communication formed by the even hops, an odd node and another odd node have a direct route therebetween, so that a message packet may be transmitted from this odd node to another odd node without passing through another even node, and forwarding the message packet can be omitted at least once.

From another point of view, it is possible in the network S to perform at least one odd hop and at least one even hop from a respective node, that is, each node is able to connect to at least one odd node and at least one even node. This action may increase the possibility of communication between different nodes and may prevent even nodes from only being allowed to connect to odd nodes or even nodes, and prevent odd nodes from only being allowed to connect to odd nodes. Accordingly, the average distance provided in the network S may be reduced.

In addition, the total number of nodes in the network S provided in the present disclosure can be any even number. Unlike the network topology system provided in the present disclosure, the total number of nodes in the network systems provided by most of the other topologies, such as fat-tree, torus, flattened butterfly, dragonfly or Slim Fly, can not be an arbitrary even number. The structures of the networks constructed from these algorithms are limited by the factorization form or prime factorization form of the total number of nodes, leading to the limitations on the performance of the networks and the freedom of design. From another point of view, if the total number of nodes in the network topology utilized by the user has a characteristic not fitting in the requirements of these algorithms, the user cannot obtain any desired network using these algorithms. In contrast, the total number of nodes in the network topology system provided in the present disclosure can be any even number, providing great flexibility to the user. The following explains the method for generating networks with the topology system in the present disclosure.

Figure 2:
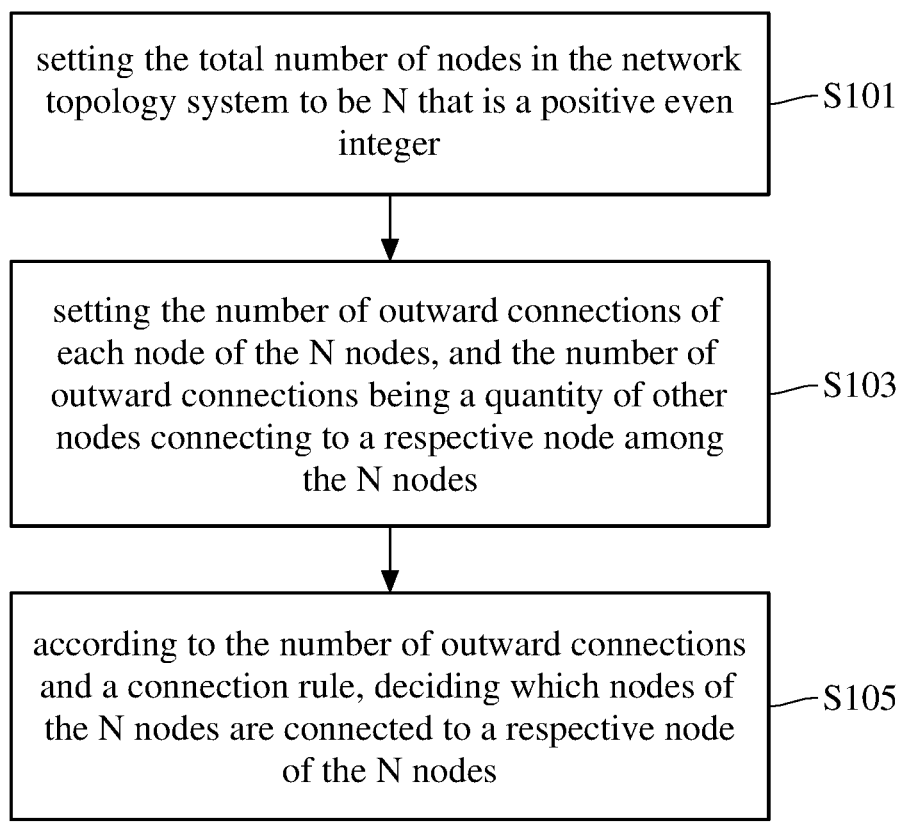
FIG. 2 is a flow chart of a topology building method of the network topology system according to an embodiment of the disclosure.

In accordance with the above description, the present disclosure accordingly provides a set of topology building method for networks of the network topology system. FIG. 2 is a flow chart of a set of topology building method of the network topology system according to an embodiment of the current disclosure. In step S101, the number of nodes for target networks in the network topology system is set to be N, and N is a positive even integer. In step S103, the number of outward connections of each node is set, and the number of outward connections is the number of other nodes to which each node is connected.

In practice, after step S103, when the topology structure is relatively simple (e.g. the number of nodes is not many or the number of hops performed outwardly from a respective node is not many), it is possible to determine all possible topologies according to the connection rule described above and the number of odd nodes and the number of even nodes to which each node is connected, and then to select the best one from the possible topologies by evaluating each of the possible topologies according to corresponding indices. Here, the indices are, for example, the average distance or the network diameter, but the present disclosure is not limited thereto. Moreover, whether a topology structure is simple or not depends on the performance of a machine used for analyzing the topology, so the present disclosure does not intend to limit what kind of topology structures are eligible to be simple structures hereafter.

On the other hand, when the topology structure is considered complicated (e.g. a greater number of nodes and/or a greater number of hops of each node), the process can proceed to step S105 in FIG. 2, to obtain a better solution. In step S105, it is done according to the number of outward connections, where a set of connection rule and a self-learning algorithm to decide which nodes of the nodes are connected to a respective node of the nodes. Here, the self-learning algorithm is, for example, a genetic algorithm, and the following description is based on a case where a genetic algorithm is used.

In step S103, in an embodiment, the number of odd nodes and the number of even nodes, to which each node is connected, are set. In other words, it is done to set the number of odd hops and the number of even hops performed from a respective node. Accordingly, in step S105 of the embodiment, it is done to decide the connections according to the number of odd nodes and the number of even nodes connecting to a respective node, following the connection rule and the genetic algorithm.

In an embodiment, there are a number of solutions continuously generated in a random way under some conditions in the genetic algorithm in an example, and a relatively good solution is selected from the generated solutions. Here, a solution denotes, for example, one or more odd hops and even hops performed from a node. In practice, the number of solutions derived from step S105 has a corresponding magnitude according to the number of nodes and the number of outward connections of each node. The calculation in step S105 has corresponding calculation complexity in accordance with the magnitude of the solution set and the time required for resolving one of the solutions. In accordance with the variety of calculation complexity, step S105 may have more implements.

In step S105, it is further done to first determine the order of magnitude of the solution set constituted by all solutions according to the number of nodes and the number of outward connections of each node in an embodiment. When it is determined that the order of magnitude of the solution set is less than a preset order of magnitude, analysis and comparison are performed to all the solutions in order to select the best solution therefrom in step S105. When it is determined that the order of magnitude of the solution set is not less than the preset order of magnitude, analysis and comparison are performed to a part of the solutions generated by the genetic algorithm in order to select the relatively good solution therefrom in step S105. In one implementation, when one of the solutions fits in a predetermined threshold, this solution can serve as the final result of the genetic algorithm; in another implementation, when the number of solutions generated in the genetic algorithm has reached a threshold, one solution indicating the best performance among all the solutions can be selected as the final result of the genetic algorithm; and in yet another implementation, when the genetic algorithm does not result in the best solution after proceeding evolution a number of times, the evolution is stopped and the previous best solution is used as the final solution. Here, the threshold and the performance in an example mean that the network diameter is not larger than a related threshold and/or the average distance is not larger than a related threshold for a resulting network; and however, the present disclosure is not limited to this example. On the other hand, the present disclosure does not intend to limit the details of the evolution process of the genetic algorithm, and one of ordinary skill in the art can define it according to actual requirements after reading the specification. In the case of the embodiment in FIG. 1, the network S shown in FIG. 1 has an average distance of 1.538, and a network diameter of 2.

In the case of the network S shown in FIG. 1, the total number of nodes (e.g. N) is exemplarily set to be 14 (i.e. step S101) in the beginning, and it is also set to perform two odd hops and one even hop from a node numbered 0 in addition to connecting the node numbered 0 to a node numbered 1 and a node numbered 13 next to the node numbered 0 (i.e. step S103). Although the configuration shown in FIG. 1 has a relatively simple complexity so that all possible solutions can be easily obtained, a self-learning algorithm may be used to obtain solutions; and thus, the configuration shown in FIG. 1 herein is only for exemplary descriptions. In this case, a first solution is generated according to the genetic algorithm, and this solution is, for example, the IDs of other nodes connected to the node numbered 0. As described above, since the network topology structure provided in the present disclosure has a homogeneous configuration, i.e. a set of odd nodes and a set of even nodes respectively have rotational symmetry, the connection relationship of each of the nodes with all other nodes is equivalently obtained, while the connection relationship of a single node with all other nodes is obtained, and thus a corresponding topology is generated. Therefore, a solution can be evaluated by estimating the performance of its corresponding topology structure. Here, the performance of the topology structure means, e.g. the magnitude of the network diameter or average distance of the topology structure. Then, a next solution is continuously generated according to the existing solutions, the connection rule, and the genetic algorithm until there is a solution fitting in the predetermined threshold or the number of solutions generated in the genetic algorithm has achieved a threshold.

From another point of view, by the topology building method in the present disclosure, a set of networks can be built when the number of outward connections of each node is set. In the development of technology nowadays, all the solutions provided by the researchers with respect to a large-scale network (e.g. a network having millions or more of nodes) face a problem, namely an excessively large network diameter or average distance in the network. However, when the number of outward connections of each node is limited, the topology building method provided in the present disclosure may be used efficiently to build such a large-scale network having an excellent network diameter, an outstanding average distance, low routing energy and time cost, and better adaptability to traffic modes, and consequently, the current disclosure is truly practical.

Figure 3:
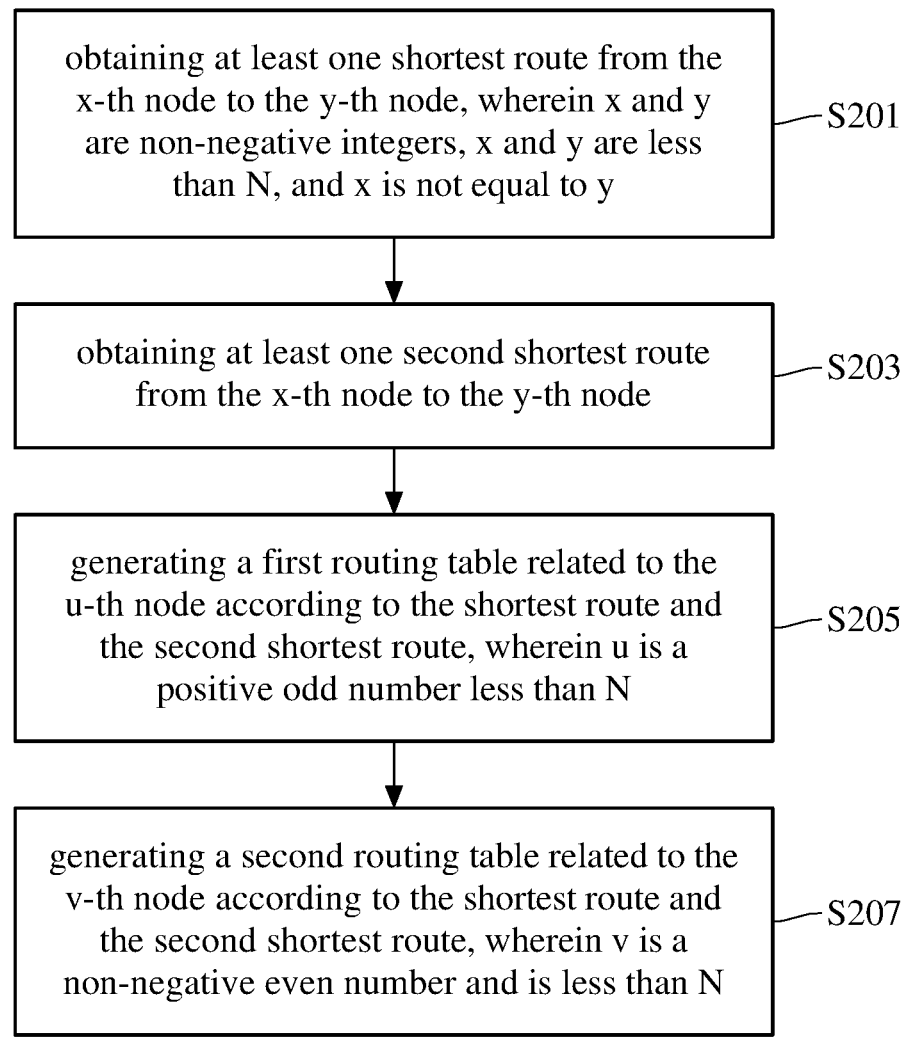
FIG. 3 is a flow chart of a route building method of the network topology system according to another embodiment of the disclosure.

Please refer to FIG. 3, a flow chart of a route building method of the network topology system according to another embodiment of the disclosure. In the embodiment shown in FIG. 3, the route building method for the network topology system includes the following steps. Step S201 is to obtain at least one shortest route from the x-th node to the y-th node, wherein x and y are non-negative integers, x and y are less than N, and x is not equal to y. Step S203 is to obtain at least one second shortest route from the x-th node to the y-th node. Step S205 is to generate a first routing table related to the u-th node according to the shortest route(s) and the second shortest route(s), wherein u is a positive odd number and is less than N. Step S207 is to generate a second routing table related to the v-th node according to the shortest route(s) and the second shortest route(s), wherein v is a non-negative even number and is less than N. Here, the first routing table is essentially equivalent to the second routing table. Also, a shortest route is defined to be, for example, a route passing through the minimum number of nodes; and similarly, a second shortest route is defined to be, for example, a route passing through the second minimum number of nodes.

From another point of view, in step S201, at least one shortest route from the x-th node to another node is obtained; and in step S203, at least one second shortest route from the x-th node to another node is obtained. In an exemplary embodiment, the Dijkstra algorithm is used for determining the shortest routes between nodes in the above steps, and also is used for obtaining the at least one second shortest route from the information about candidate route(s) generated in the determination of the shortest route. In this embodiment, a second shortest route from the x-th node to the y-th node includes a first sub route and a second sub route. The first sub route is a route from the x-th node to the z-th node, and the second sub route is a route from the z-th node to the y-th node. The z-th node is connected to or communicates with the y-th node. In other words, the x-th node sends the relative information to a neighbor of the y-th node through the first sub route.

In practice, since the network topology system provided in the present disclosure has an homogeneous configuration and the odd nodes have a symmetry opposite that of the even nodes in the network topology system, the odd nodes in the network topology system provided in the present disclosure can use similar routing table or routing method, whereas the even nodes can use another similar routing table or routing method. This feature enables the routing rule of the present disclosure to have the complexity of O(N) rather than the complexity of $O(N^2)$ in regards to an irregular topology. Therefore, in step S205, the first routing table related to the u-th node is generated according to the shortest routes and the second shortest routes from the x-th node to other nodes. In step S207, the second routing table related to the v-th node is generated according to the shortest route(s) and the second shortest route(s) from the x-th node to other nodes.

The u-th node denotes an odd node among all nodes, and the v-th node denotes an even node among all nodes. That is, in the network topology building method provided in the present disclosure, the routing tables of all nodes in the network topology system can be obtained in accordance with the connection relationship of a node relative to other nodes.

Continuing the above description, in the network topology system provided in the present disclosure, the configuration is the same from the view point of any odd node (that is, for any two odd nodes, the configuration of the network topology system is the same) and the configuration is the same from the view point of any even node (that is, for any two even nodes, the configuration of the network topology system is the same) regardless of IDs and only considering the linking of nodes. However, the configuration from the point of view of an odd node is the reverse of the configuration from the point of view of an even node (that is, the configuration of the network topology system in respect of any odd node is the reverse of the configuration of the network topology system in respect of any even node). Therefore, when the content of a routing table of an odd node is defined, the routing table of this odd node can be adjusted to be a routing table of another odd node according to the relative position of the two odd nodes (e.g. the IDs). Likewise, when the content of a routing table of an even node is defined, this routing table can be adjusted to be a routing table of another even node according to the relative position of the two even nodes (e.g. the difference between the IDs). However, in practice, since the connection direction of the odd nodes is opposite to the connection direction of the even nodes, the routing table of an odd node can be adjusted to be the routing table of an even node, or the routing table of an even node can be adjusted to be the routing table of an odd node.

In an embodiment, there is a first route defined in the first routing table of the u-th node, and there is a second route defined in the second routing table of the v-th node. The starting point of the first route is the u-th node, and the end point of the first route is the u1-th node. The starting point of the second route is the v-th node, and the end point of the second route is the v1-th node. u1 is $[(u+du1) \mod N]$, v1 is $[(v+N-du1) \mod N]$, and u1 and v1 are non-negative integers and are less than N. In the case of the network topology system shown in FIG. 1, if u is 1, u1 is 6 and v is 2, v1 will be 11.

In another embodiment, there is a first route defined in the first routing table of the u-th node, and there is a second route defined in the second routing table of the v-th node. The starting point of the first route is the u-th node, the end point of the first route is the u3-th node, and the first route passes through the u2-th node. The starting point of the second route is the v-th node, the end point of the second route is the v3-th node, and the second route passes through the v2-th node. u2 is $[(u+du2) \mod N]$, u3 is $[(u+du3) \mod N]$, v2 is $[(v+N-du2) \mod N]$, v3 is $[(v+N-du3) \mod N]$, u2, u3, v2, and v3 are non-negative integers, and u2, u3, v2, and v3 are less than N. In the case of the network topology system shown in FIG. 1, if u is 1, u2 is 5, u3 is 10 and v is 2, v2 will be 12 and v3 will be 7.

The respective first route and respective second route described above are only for exemplarily explaining the difference between the route of odd nodes and the route of even nodes, but not for denoting the shortest routes or second shortest routes between the starting point and the end point described above.

In an embodiment, it is unnecessary to record the complete route in the message packet, so the header of the message packet can be reduced in length. That is, it can be prevented that the network S utilizes the way of source routing, so as to avoid of the increase of message traffic in the system. In another embodiment, the message packet only needs to record the relative position of the starting and end nodes in the network topology system, and when another node receives this message packet, this node can decide, according to the starting point and the end point recorded in the message packet, which one of the other nodes the message packet should be sent to. Even, when a traffic jam occurs to nodes on the shortest route, a node receiving the message packet can timely change the routing scheme so that the message packet can be re-routed to another shortest route or a second shortest route.

As set forth above, the present disclosure provides a network topology system and a topology building method and routing table building method thereof, and the network topology system basically has an improved chordal ring configuration. In an embodiment of the network topology system, the connection direction of nodes having odd IDs is opposite to the connection direction of nodes having even IDs. From another point of view, when it is defined that an odd hop is performed from an odd node in a forward direction, an even node is defined to have an odd hop in a backward direction. In this way, the number of connections between nodes can be reduced. Also, since the designer can calculate that the total number of connections of a node according to the outward connections of the node, it is thus a useful guidance during the design process. In addition, every of the odd nodes and even nodes further has a similar even hop in the same direction. Therefore, a message package in a route starting from an odd node can be prevented from being forwarded many times in order to arrive at another odd node (i.e. the end point of the route), and a message package in a route starting from an even node can be prevented from being forwarded many times in order to arrive at another even node (i.e. the end point of the route).

Accordingly, the network topologies built by the topology building method provided in the present disclosure further have a sufficiently small network diameter and average distance in addition to having a homogeneous configuration. Moreover, in each of the network topologies derived from the present disclosure, there exists a set of odd nodes having rotational symmetry and a set of even nodes also having rotational symmetry. In this case, all the nodes can use the essentially equivalent routing table so that the routing protocol can further be simplified and the routing scheme is more flexible and may avoid a gridlock on most of the nodes due to the occurrence of a traffic jam to a single node.

Therefore, when the network topology system provided in the present disclosure is employed to transmit a message packet, this message packet is transmitted via a relatively short route so that the delay time may be reduced and the load on each network switch may be reduced as well. In another aspect, the complexity of the routing table building method resulted from the topology building method is $O(N)$ rather than the complexity of $O(N^2)$ of an irregular topology, so as to save large memory resources required by network switches to store routing tables. On the other hand, in the past no one brought forth the idea of the routing method based on a regular chordal ring topology, and no one brought forth the idea of the strategy that greatly reducing the routing memory requirements using the advantage of a symmetric chordal ring configuration. The network topology system and the topology building method and routing table building method thereof in the present disclosure employ a connection rule, by which the simplified routing protocol can be carried out. On the basis of the chordal ring structure having a small network diameter, the disclosed connection rule, and routing rule may lead to the high-performance parallel computing.

What is claimed is:

1. A network topology system, comprising:
N nodes for data exchange, which are sequentially connected to form a ring communication configuration,
wherein an i-th node of the N nodes is further connected to a [(i+m) mod N]th node of the N nodes and a [(i+p) mod N]th node of the N nodes according to a connection rule,
wherein a j-th node of the N nodes is further connected to a [(j−m) mod N]th node of the N nodes and a [(j+p) mod N]th node of the N nodes according to the connection rule, and
wherein N is a positive even integer, i and j are less than N, m and p are not larger than N, i and m are positive odd numbers, j is a non-negative even number, and p is a positive even number.

2. The network topology system according to claim 1, wherein among the N nodes, the i-th node is further connected to a [(i+n) mod N]th node according to the connection rule, the j-th node is further connected to a [(j−n) mod N]th node according to the connection rule, the i-th node is further connected to a [(i+q) mod N]th node according to the connection rule, the j-th node is further connected to a [(j+q) mod N]th node according to the connection rule, n is a positive odd number, and q is a positive even number.

3. The network topology system according to claim 1, wherein each of the N nodes is a network switch.

4. A topology building method for a network topology system that comprises a plurality of nodes for data exchange, the plurality of nodes being sequentially connected to form a ring communication configuration, and the topology building method comprising:
setting the total number of the plurality of nodes in the network topology system to be N;
setting the number of outward connections of each node of the plurality of nodes, and the number of outward connections being a quantity of other nodes connecting to a respective node among the plurality of nodes; and
according to the number of outward connections and a connection rule, deciding which nodes of the plurality of nodes are connected to a respective node of the plurality of nodes;
wherein in the connection rule, when an i-th node of the plurality of nodes is connected to [(i+m) mod N]th and [(i+p) mod N]th nodes of the plurality of nodes, an j-th node of the plurality of nodes is connected to [(j−m) mod N]th and [(j+p) mod N]th nodes of the plurality of nodes,
wherein N is a positive even integer, i and j are less than N, m and p are not larger than N, i and m are positive odd numbers, j is a non-negative even number, and p is a positive even number.

5. The topology building method according to claim 4, wherein according to the number of outward connections and the connection rule, deciding which nodes of the plurality of nodes are connected to a respective node of the plurality of nodes, comprises:
according to the number of outward connections, the connection rule, and a genetic algorithm, deciding which nodes of the plurality of nodes are connected to a respective node of the plurality of nodes.

6. The topology building method according to claim 5, wherein setting the number of outward connections of each node of the plurality of nodes is respectively setting the number of odd nodes of the plurality of nodes and the number of even nodes of the plurality of nodes connected to a respective node of the plurality of nodes.

7. The topology building method according to claim 5, wherein in the connection rule, when the i-th node is further connected to a [(i+n) mod N]th node of the plurality of nodes, the j-th node is further connected to a [(j−n) mod N]th node of the plurality of nodes; and
the i-th node is further connected to a [(i+q) mod N]th node of the plurality of nodes according to the connection rule, and the j-th node is further connected to a [(j+q) mod N]th node of the plurality of nodes according to the connection rule, n is a positive odd number, and q is a positive even number.

8. A routing table building method for a network topology system comprising N nodes for data exchange, wherein the N nodes are sequentially connected to form a ring communication configuration, an i-th node of the N nodes is further connected to [(i+m) mod N]th and [(i+p) mod N]th nodes of the N nodes according to a connection rule, an j-th node of the N nodes is further connected to [(j−m) mod N]th and [(j+p) mod N]th nodes of the N nodes according to the connection rule, N is a positive even integer, i and j are less than N, m and p are not larger than N, i and m are positive odd numbers, j is a non-negative even number, and p is a positive even number, and the routing table building method comprising:
obtaining at least one shortest route from an x-th node of the N nodes to a y-th node of the N nodes;
obtaining at least one second shortest route from the x-th node to the y-th node;
generating a first routing table related to a u-th node of the N nodes according to the shortest routes and the second shortest routes; and
generating a second routing table related to a v-th node of the N nodes according to the shortest routes and the second shortest routes;
wherein the first routing table is essentially equivalent to the second routing table, x and y are non-negative integers, x and y are less than N, x is not equal to y, u is a positive odd number, u is less than N, v is a non-negative even number, and v is less than N.

9. The routing table building method according to claim 8, wherein there is a first route defined in the first routing table of the u-th node, there is a second route defined in the second routing table of the v-th node, a starting point of the first route is the u-th node, an end point of the first route is a u1-th node of the N nodes, a starting point of the second route is the v-th node, and an end point of the second route is a v1-th node of the N nodes; and
wherein u1 is [(u+du1) mod N], v1 is [(v+N−du1) mod N], u1 and v1 are non-negative integers, and u1 and v1 are less than N.

10. The routing table building method according to claim 8, wherein, there is a first route defined in the first routing table of the u-th node, there is a second route defined in the second routing table of the v-th node, a starting point of the first route is the u-th node, an end point of the first route is a u3-th node of the N nodes, the first route passes through a u2-th node of the N nodes, a starting point of the second route is the v-th node, an end point of the second route is a v3-th node of the N nodes, and the second route passes through a v2-th node of the N nodes; and wherein u2 is [(u+du2) mod N], u3 is [(u+du3) mod N], v2 is [(v+N−du2) mod N], v3 is [(v+N−du3) mod N], u2, u3, v2 and v3 are non-negative integers, and u2, u3, v2 and v3 are less than N.

11. The routing table building method according to claim 8, wherein a second shortest route from the x-th node to the y-th node comprises a first sub route and a second sub route, the first sub route is a route from the x-th node to a z-th node of the N nodes, and the second sub route is a route from the z-th node to the y-th node; and wherein the z-th node is directly connected to the y-th node.

\* \* \* \* \*